Sept. 19, 1950
J. M. PATON
2,522,837
LOG ROLLER
Filed July 28, 1948
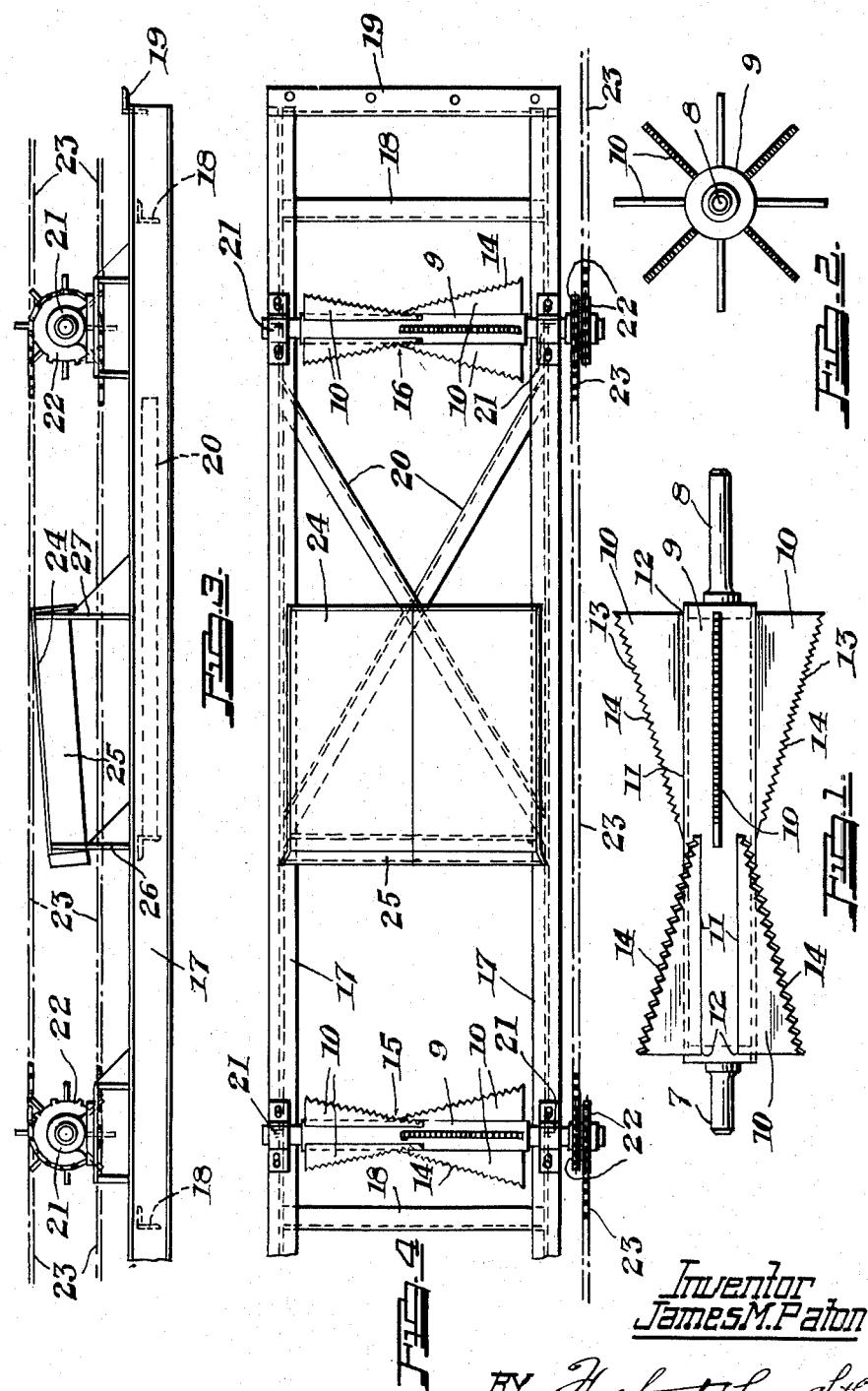
Inventor
James M. Paton Patented Sept. 19, 1950

2,522,837

UNITED STATES PATENT OFFICE 2,522,837

LOG ROLLER

James M. Paton, Fort Williams, Ontario, Canada

Application July 28, 1948, Serial No. 41,135
In Canada June 11, 1948

6 Claims. (Cl. 198—127)

1

The invention relates to endwise conveyance of logs and is concerned with conveyors having power-driven rollers.

Due to the great weight of logs and the steepness of inclines up which they often must be conveyed it has been difficult to provide sufficient traction between the surfaces of power-driven rollers in a log conveyor and the tough bark of a log. A form of power-driven roller commonly used is one having spikes arranged circumferentially in longitudinal rows for engagement with the bark of the log. Often these spikes engaged only the flaky outer surface of the bark which, not being strong enough to transmit the tractive force applied, became loosened and caused slippage between the roller and the log.

I have discovered that the drive between a power-driven roller of a conveyor and a log being conveyed can be made more positive by having the log-engaging teeth arranged in rows spaced circumferentially and extending longitudinally of the roller from its ends substantially to its centre with the rows from one end arranged alternately with the rows from the other end, the log-engaging ends of the teeth in each row forming a line of log-engagement adapted to roll a log toward the centre of the roller.

Since, according to the invention, the rows of teeth from one end of the roller are arranged alternately with those from the other end, and since the log engaging ends of the teeth slope downwardly towards the centre of the roller, the log while resting on any one row of teeth rolls down that row. The next row of teeth engaging the log is one extending from the opposite end of the roller and sloping in a direction to make the log roll back to its former position. Thus the log while being conveyed is kept rocking on the rollers by the alternately opposed slopes of successive rows of teeth. This rocking motion causes the teeth to cut into the log surface giving positive traction.

A preferred embodiment of the invention is one in which the teeth consist of serrations along the edge of metal plates extending radially from a metal tube which forms the hub of the roller. These plates may extend past the centre of the roller.

In another embodiment, a trough shaped member is between two successive rollers to prevent teetering of a log should it be engaged by one of the rollers only. This is of particular advantage in preventing teetering as the log leaves the conveyor over the last roller.

The invention will be further described by reference to the attached drawings which illustrate an embodiment of it, and in which Figure 1 is a plan view of an individual roller according to the invention;

Figure 2 is an end view of the roller shown in Figure 1;

Figure 3 is an elevational view of part of a conveyor having rollers according to the invention; and Figure 4 is a plan view of the conveyor shown in Figure 3.

In Figures 1 and 2, a roller is shown constructed according to the invention which comprises spindles 7 and 8 fixed in the ends of a metal tube 9 which forms the hub of the roller. Metal plates 10 having the shape of right-angled triangles are welded along an edge 11 to the tube 9 with the right-angled corners 12 of successive plates 10 around the tube 9 at opposite ends of the tube 9. The welded edge 11 of each triangular plate 10 extends axially toward the centre of the tube 9 with a serrated edge 13 forming the hypotenuse and sloping downwardly toward the centre of the tube 9. Serrations 14 along the edges of the plate 10 form log engaging teeth.

As shown in Figures 3 and 4, the rollers 15 and 16 may be mounted to form a power driven log conveyor. The frame of the conveyor is formed by longitudinal members 17, spacing members 18, an end member 19 and brace members 20. The rollers 15 and 16 are mounted in bearings 21 and are power-driven through sprockets 22 and a chain 23.

Between the rollers is a teeter prevention trough 24 which consists of a trough-shaped member 25 supported on the frame members 17 by legs 26 and 27. The legs are of a length suitable for holding the trough at approximately the level of log travel with the legs 26 slightly shorter than the legs 27 to prevent the log butting against the end of the trough-shaped member 25.

In operation, a log is driven along the conveyor by rotation of the rollers 15 and 16 (by means of the chains 23 and sprockets 22) which causes each plate 10 to engage the log, lift the log upwardly and rock it back and forth on the teeth 14. As the log rocks, teeth 14 cut into the log and drive it forward along the conveyor. As the tail end of a log leaves the roller 15, its centre of gravity may not have reached the roller 16 and, therefore, its tail end tends to drop toward the conveyor frame. This teetering of the log on the roller 16 is prevented, according to the invention, by providing a teeter prevention trough 24 between the rollers 15 and 16. When the tail end of the log falls below the line of log travel, the trough 25 supports it until its centre of gravity is a substantial distance forward of the roller 16.

What I claim as my invention is:

1. For use in a log conveyor, a roller adapted to be driven to advance a log endwise comprising, a hub, log-engaging teeth carried by and spaced circumferentially of said hub and extending in rows longitudinally thereof from its ends substantially to its center with the rows from one end arranged alternately with the rows from the other end, the distance from the log-engaging ends of said teeth in each row to the axis of rotation of the roller being less by steps from the ends of the roller to the center of the roller.

2. For use in a log conveyor, a roller adapted to be driven to advance a log endwise comprising, a hub, log-engaging teeth carried by and spaced circumferentially of said hub and extending in rows longitudinally thereof from its end past its center with the rows from one end arranged alternately with the rows from the other end, the distance from the log-engaging ends of said teeth in each row to the axis of the rotation of the roller being less by steps from the ends of the roller to the center of the roller.

3. For use in a log conveyor, a roller adapted to be driven to advance a log endwise comprising, a hub having a substantially uniform cross-section, log-engaging teeth in the form of serrations along the edges of metal plates extending radially from the roller and spaced apart circumferentially of the roller, said plates extending longitudinally of the roller from the ends of the roller substantially to its center with said plates extending from one end arranged alternately with said plates extending from the other end, the distance from the log-engaging ends of said teeth in each plate to the axis of rotation of the roller being less by steps from the ends of the roller to the center of the roller.

4. A roller as defined in claim 3 in which the hub of the roller is a metal tube to which the radial plates are welded.

5. A roller as claimed in claim 1 in which the distance from any point on the outer surface of the hub of the roller to the axis of rotation of the roller is less than the distance from said axis to the log-engaging ends of the teeth located at the same distance from the ends of the hub as said point.

6. A roller as claimed in claim 2 in which the distance from any point on the outer surface of the hub of the roller to the axis of rotation of the roller is less than the distance from said axis to the log-engaging ends of the teeth located at the same distance from the ends of the hub as said point.

JAMES M. PATON.

REFERENCES CITED

The following references are of record in the file of this patent:

UNITED STATES PATENTS

| Number | Name | Date |
|---|---|---|
| 475,628 | Stombs | May 24, 1892 |
| 671,991 | Diescher | Apr. 16, 1901 |
| 807,312 | Patterson | Dec. 12, 1905 |
| 1,780,493 | McKee | Nov. 4, 1930 |
| 1,888,004 | Macleod | Nov. 15, 1932 |
| 2,217,075 | O'Malley | Oct. 8, 1940 |